(12) United States Patent
Yu et al.

(10) Patent No.: US 10,566,834 B2
(45) Date of Patent: Feb. 18, 2020

(54) SYSTEMS AND METHODS FOR QUICK POWER DELIVERY MODE CHANGES

(71) Applicant: SCHNEIDER ELECTRIC IT CORPORATION, West Kingston, RI (US)

(72) Inventors: Qinghong Yu, Carlisle, MA (US); Kaushal J. Patel, Lowell, MA (US); Adam Daniel Sanner, Nashua, NH (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 589 days.

(21) Appl. No.: 15/300,919

(22) PCT Filed: Apr. 4, 2014

(86) PCT No.: PCT/US2014/032932
§ 371 (c)(1),
(2) Date: Sep. 30, 2016

(87) PCT Pub. No.: WO2015/152938
PCT Pub. Date: Oct. 8, 2015

(65) Prior Publication Data
US 2017/0018959 A1    Jan. 19, 2017

(51) Int. Cl.
*H02J 9/06* (2006.01)
*H01H 51/27* (2006.01)
*H01H 50/58* (2006.01)

(52) U.S. Cl.
CPC .............. *H02J 9/061* (2013.01); *H01H 50/58* (2013.01); *H01H 51/27* (2013.01); *H01H 2235/01* (2013.01)

(58) Field of Classification Search
CPC ......... H02J 9/061; H01H 50/58; H01H 51/27; H01H 2235/01
(Continued)

(56) References Cited

U.S. PATENT DOCUMENTS 2,728,878 A   12/1955  Sperr, Jr.
5,343,379 A    8/1994  Kirchberg et al.
(Continued)

FOREIGN PATENT DOCUMENTS

CN     100505485 C   6/2009
DE    102012207739 B3  10/2013

OTHER PUBLICATIONS

Extended European Search Report from corresponding European Application No. 14888186.5 dated Nov. 2, 2107.
(Continued)

*Primary Examiner* — Dinh T Le
(74) *Attorney, Agent, or Firm* — Lando & Anastasi, LLP

(57) ABSTRACT

According to one aspect, an uninterruptable power supply (UPS) is provided. The UPS includes a first input constructed to receive input power from a first power source, a second input constructed to receive input power from a second power source, an output constructed to provide output alternating current (AC) power derived from at least one of the first power source and the second power source, a bypass switch having an on state and an off state coupled between the first input and the output, an inverter coupled between the second input and the output and constructed to generate the output AC power. The UPS being constructed to quickly transition from a first power delivery mode that provides output power derived from the first power source to a second power delivery mode that provides output power derived from the second power source.

17 Claims, 7 Drawing Sheets

(58) Field of Classification Search
USPC .......................................................... 327/52
See application file for complete search history.

(56) References Cited

U.S. PATENT DOCUMENTS

| | | | |
|---|---|---|---|
| 5,510,951 A | 4/1996 | Briedis et al. | |
| 6,101,082 A | 8/2000 | Benkaroun et al. | |
| 6,295,215 B1 * | 9/2001 | Faria ...................... | H02J 9/062 363/124 |
| 6,373,216 B1 * | 4/2002 | Ho ............................ | H02P 7/05 307/64 |
| 7,239,043 B2 | 7/2007 | Taimela et al. | |
| 7,652,397 B2 * | 1/2010 | Lin .......................... | H02J 9/062 307/147 |
| 7,939,968 B2 * | 5/2011 | Hjort ....................... | H02J 9/062 307/46 |
| 7,948,118 B2 * | 5/2011 | Chambon ................ | H02J 9/005 307/66 |
| 9,000,613 B2 * | 4/2015 | Shetler, Jr. .............. | H02J 9/062 307/64 |
| 9,154,000 B2 * | 10/2015 | Sato ........................ | H02J 9/062 |
| 2003/0048006 A1 | 3/2003 | Shelter et al. | |
| 2004/0251440 A1 | 12/2004 | Gnadinger et al. | |
| 2005/0012505 A1 | 1/2005 | Wilson et al. | |
| 2006/0164782 A1 | 7/2006 | Colombi et al. | |
| 2008/0265680 A1 | 10/2008 | Marwali et al. | |
| 2014/0062201 A1 * | 3/2014 | Giuntini ........... | G01R 19/16547 307/64 |

OTHER PUBLICATIONS

Koutroulis et al. A bidirectional, sinusoidal, high-frequency inverter design. IEE Proc.-Electr. Power Appl. vol. 148, No. 4, Jul. 2001 [retrieved Jul. 24, 2014]. Retrieved from the Internet: <URL: http://www.tuc.gr/fileadmin/users_data/elci/Kalaitzakis/J.19.pdf>. pp. 315-321.

Kumar et al. Neural Network Controller for Enhancement of Uninterruptible Power Supply Inverter. International Journal of Recent Technology and Engineering (IJRTE). vol. 1, Issue 3, Aug. 2012 [retrieved Jul. 24, 2014). Retrieved from the Internet: <URL:http://www.ijrte.org/attachments/File/v1i3/C0250061312.pdf>. pp. 10-16.

Notification of Transmittal of the International Search Report and the Written Opinion of the International Searching Authority from corresponding PCT/US2014/032932 dated Aug. 21, 2014.

Ramesh et al. Single Phase Based on UPS Applied to Voltage Source Inverter and Z-Source Inverter by Using Matlab/Simulink. International Journal of Engineering Science and Innovative Technology. vol. 3, Issue 2, Mar. 2014 [retrieved Jul. 24, 2014]. Retrieved from the Internet: <URL: http://www.ijesit.comNolume% 203/Issue%202/IJESIT201402_14.pdf>. pp. 100-108.

* cited by examiner

SYSTEMS AND METHODS FOR QUICK POWER DELIVERY MODE CHANGES

CROSS-REFERENCE TO RELATED APPLICATIONS

This application is a U.S. National Stage Application under 35 U.S.C. § 371 of International Application No. PCT/US2014/032932, filed Apr. 4, 2014, titled SYSTEMS AND METHODS FOR QUICK POWER DELIVERY MODE CHANGES, which is hereby incorporated herein by reference in its entirety.

BACKGROUND

Technical Field

Embodiments of the present disclosure relate generally to quick power delivery mode changes. More specifically, embodiments relate to systems and methods for quick power delivery mode changes in uninterruptable power supplies (UPS).

Background Discussion

UPS's are generally used to isolate an external load from power disturbances including, for example, power surges, sags, glitches, blackouts, and brownouts. UPS's isolate an external load from power disturbances by deriving output power from multiple power sources. In the event that a power disturbance is detected from a first power source, the UPS may derive output power from a separate second power source.

SUMMARY

According to one aspect, a UPS is provided. The UPS comprises a first input constructed to receive input power from a first power source, a second input constructed to receive input power from a second power source, an output constructed to provide output alternating current (AC) power derived from at least one of the first power source and the second power source, a bypass switch having an on state and an off state coupled between the first input and the output, an inverter coupled between the second input and the output and constructed to generate the output AC power based on inverter commands, and a controller coupled to the inverter. The controller configured to detect a power failure of the first power source, disconnect the first input from the output at least in part by changing the bypass switch from the on state to the off state responsive to detecting the power failure, and generate the inverter commands to output AC power derived from the second power source based on an inverter reference signal responsive to detecting the power failure, the inverter reference signal being a non-sinusoidal voltage signal for a first period of time and a sinusoidal voltage reference after the first period of time.

In one embodiment, the non-sinusoidal voltage reference is one of a square wave, a pulse train, and a flat-top sinusoidal signal. In one embodiment, the first period of time is between 1 and 1.5 power cycles.

In one embodiment, the UPS further comprises an inverter switch having an on state and an off state coupled between the inverter and the output. In this embodiment, controller may be coupled to the inverter switch and further configured to connect the inverter to the output at least in part by changing the state of the inverter switch from the off state to the on state.

In one embodiment, the bypass relay switch comprises a first terminal coupled to the first input, a second terminal coupled to the output, a first power source terminal constructed to receive power at a first voltage level, a second power source terminal constructed to receive power at a second voltage level, the second voltage level being lower than the first voltage level, a movable armature coupled between the first port and the second port, the movable armature having a first state that connects the first terminal to the second terminal and a second state that disconnects the first terminal from the second terminal, a circuit coupled to the first power source terminal and to the second power source terminal, the circuit constructed to induce a coil to create a first magnetic field of a first strength to move the moveable armature from the first state to the second state by applying the first voltage level to the coil and to induce the coil to create a second magnetic field of a second strength to maintain the movable armature in the second position by applying the second voltage level to the coil, the second strength being weaker than the first strength, and a spring coupled to the moveable armature, the spring constructed to hold the moveable armature in the first state against an opposing magnetic field of the second strength. The UPS may further comprise a direct current (DC) bus coupled to the inverter and wherein the DC bus has a voltage level substantially equal to the first voltage at the first power terminal of the bypass relay switch. The coil may have a voltage rating substantially equal to the second voltage level at the second terminal of the bypass relay switch.

In one embodiment, the circuit of the bypass switch includes a first diode coupled between the first power source terminal and the coil and a second diode coupled between the second power source terminal and the coil. The circuit of the bypass switch may further include a resistor coupled between the first diode and the first power source terminal.

According to one aspect, a method for operating a UPS is provided. The method comprises receiving input power from a first power source, providing output power to an external load based on the input power from the first power source, detecting a power failure of the first power source, disconnecting the first power source from the external load responsive to detecting the power failure of the first power source, receiving input power from a second power source, generating inverter commands based on an inverter reference signal, and generating output alternating current (AC) power derived from the second power source based on the inverter commands. The act of generating inverter commands includes generating a non-sinusoidal inverter voltage reference signal for a first period of time and generating a sinusoidal inverter voltage reference signal after the first period of time.

In one embodiment, generating the non-sinusoidal reference voltage signal includes generating one of a square wave, a pulse train, and a flat-top sinusoidal signal. In one embodiment, the first period of time is between 1 and 1.5 power cycles.

In one embodiment, disconnecting the first power source from the external load includes changing a bypass switch coupled between the first power source and the external load from an on state to an off state. In this embodiment, changing the bypass switch from the on state to the off state may include moving a moveable armature of the electromagnetic relay from a closed state first state to an open state by a spring coupled to the movable armature. The bypass switch may further include a coil having a voltage rating and wherein the spring is constructed to hold the moveable armature in the open state against an opposing magnetic field generated by applying a voltage level equal to the voltage rating to the coil.

In one embodiment, generating inverter commands includes generating pulse width modulation (PWM) commands.

According to one aspect, a UPS is provided. The UPS comprises a first input constructed to receive input power from a first power source, a second input constructed to receive input power from a second power source, an output constructed to provide output alternating current (AC) power derived from at least one of the first power source and the second power source, a bypass switch having an on state and an off state coupled between the first input and the output, an inverter coupled between the second input and the output and constructed to generate the output AC power, and means for transitioning the UPS from a first power delivery mode that provides output power derived from the first power source to a second power delivery mode that provides output power derived from the second power source.

In one embodiment, the means for transitioning the UPS from the first power delivery mode to the second power delivery modes includes a means for reducing a period of time required for the bypass switch to change from the on state to the off state.

In one embodiment, the means for transitioning the UPS from the first power delivery mode to the second power delivery mode includes a means for quickly providing output power from the inverter in the second power delivery mode.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed subject matter. Particular references to examples and embodiments, such as "an embodiment," "another embodiment," "some embodiments," "other embodiments," "an alternate embodiment," "various embodiments," "one embodiment," "at least one embodiments," "this and other embodiments" or the like, are not necessarily mutually exclusive and are intended to indicate that a particular feature, structure, or characteristic described in connection with the embodiment or example and may be included in that embodiment or example and other embodiments or examples. The appearances of such terms herein are not necessarily all referring to the same embodiment or example.

Furthermore, in the event of inconsistent usages of terms between this document and documents incorporated herein by reference, the term usage in the incorporated references is supplementary to that of this document; for irreconcilable inconsistencies, the term usage in this document controls. In addition, the accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
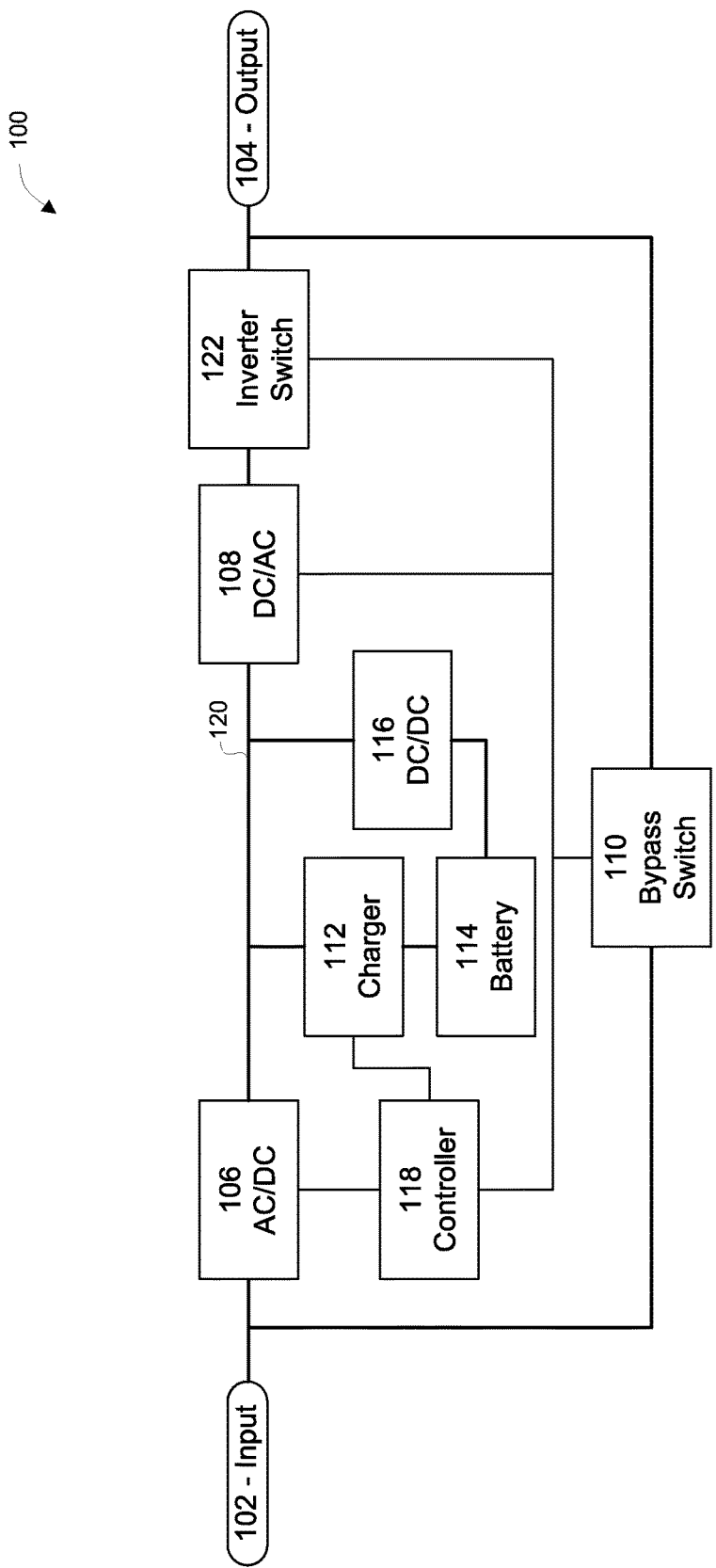
FIG. 1 illustrates a block diagram of a UPS in accordance with one embodiment.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As described above, UPS's isolate a load from power disturbances by providing output power to a load derived from various power sources. The load, however, may be starved of power during a switching process performed by the UPS to transition from a first mode delivering output power from a first power source to a second mode delivering output power from a second power source. Aspects of the current disclosure relate to UPS's with quick power delivery mode changeover capabilities to reduce the time required to change power delivery modes.

In one embodiment, a UPS employs a bypass relay with a mechanical overdrive that controls the connection between a first power source and an external load. In this embodiment, the bypass relay with a mechanical overdrive employs an overrated spring that reduces the time required for the relay to change state and thereby reduce the time required to transition from providing output power from the first power source to providing output power from another power source.

In one embodiment, the UPS is constructed to transition from a first mode delivering alternating current (AC) power from a first AC power source to a second mode delivering AC power from a second direct current (DC) power source. In this embodiment, the UPS includes an inverter coupled between the second DC power source and the AC external load. The UPS inverter generates output power responsive to received inverter commands generated by, for example, a controller of the UPS. The controller generates the inverter commands based on an inverter voltage reference signal that may be constructed to be a non-sinusoidal wave for a first period of time. The initial non-sinusoidal wave maximizes the amount of current supplied to the external load by the inverter immediately after the external load is coupled to the inverter. After the first period is complete, the UPS may generate a sinusoidal inverter reference signal. An example UPS 100 is described below with reference to FIG. 1.

Example UPS

FIG. 1 illustrates an example online UPS 100 constructed to receive power from an external source and provide output power to a load. The UPS 100 includes an input 102, an output 104, a bypass switch 110, an AC/DC rectifier 106, a DC bus 120, a DC/AC inverter 108, a battery charger 112, a battery 114, a DC/DC converter 116, a controller 118, and an inverter switch 122.

The input 102 is constructed to receive power from an external AC power source such as a utility power source. The input 102 is selectively coupled to the AC/DC rectifier 106 that converts the input AC power to DC power. The input 102 is also selectively coupled to the output 104 via the bypass switch 110. The output 104 is constructed to output AC power to a load. The UPS may be constructed to receive via input 102 and output via output 104 single-phase AC power or three-phase AC power.

The AC/DC rectifier 106 is also coupled to the DC/AC inverter 108 via the DC bus 120. The battery 114 is coupled to the DC bus 120 via the battery charger 112 and also to the DC bus 120 via the DC/DC converter 116. The DC/AC inverter 108 is selectively coupled to the output 104 via the inverter switch 122. The controller 118 is coupled to the AC/DC rectifier 106, the DC/AC inverter 108, the bypass switch 110, the battery charger 112, the DC/DC converter 116, and the inverter switch 122. In other embodiments, the battery 114 and the charger 112 may be coupled to the AC/DC rectifier 106.

In one embodiment, the UPS 100 is configured to operate in one or more modes of operation based on the quality of the AC power received from the utility source. In this embodiment, the controller 118 monitors the AC power received from the utility source at the input 102 and, based on the monitored AC power, sends control signals to the bypass switch 110, the battery charger 112, the AC/DC rectifier 106, the DC/AC inverter 108, the DC/DC converter 116, and the inverter switch 122 to control operation of the UPS 100. The UPS modes of operation may include, for example, a bypass mode, an online mode, and a battery mode. In online mode, the bypass switch 110 is off, the inverter switch is on, and the input power received at the input 102 is rectified in the AC/DC rectifier 106 and inverted in DC/AC inverter 108 before reaching the output 104. A portion of the power received at the input port may be used to charge the battery 114 via the charger 112.

In battery mode, the UPS 100 draws power from the battery 114 via the DC/DC converter 116 to supplement and/or replace the power received at the input 102. In bypass mode, the UPS 100 directly couples the input 102 to the output 104 via the bypass switch 110 and disconnects the DC/AC inverter 108 via inverter switch 122.

One or more processes may be performed by the controller 118 to switch between various modes to minimize the probability of starving the load of power while switching modes. Example processes performed by the controller 118 during a changeover from bypass mode to battery mode is described below with reference to FIGS. 5-6. In addition to specialized processes performed by the controller 118, the bypass switch 110 may be employed with a mechanical overdrive to reduce the time required to change state. An example electromagnetic relay with a mechanical overdrive to reduce one of the opening time and the closing time that may be employed as bypass switch 110 is described below with reference to FIG. 2.

Example Electromagnetic Relay

Figure 2:
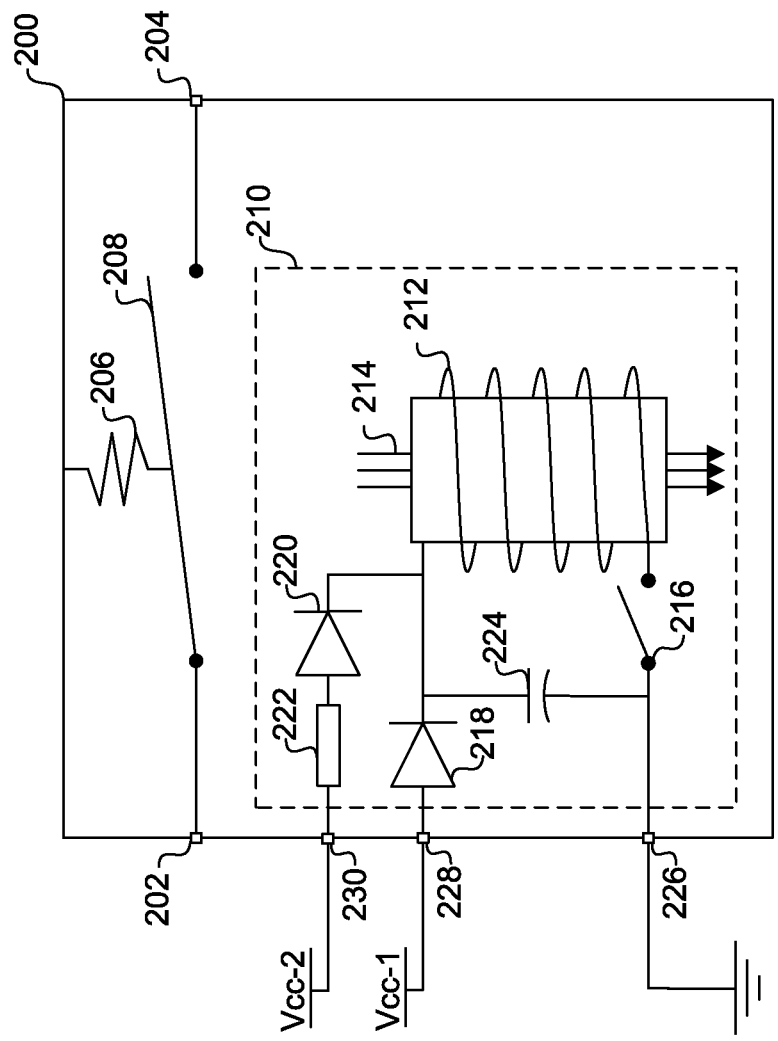
FIG. 2 illustrates one embodiment of an electromagnetic relay.

FIG. 2 illustrates an embodiment of an electromagnetic relay 200 with a mechanical overdrive that may be employed as the bypass switch 110 described above with reference to FIG. 1. The electromagnetic relay 200 includes a first port 202, a second port 204, a spring 206, a movable armature 208, a ground port 226, a first power port 228, a second power port 230, and a relay drive circuit 210 including a coil 212 that creates a magnetic field 214, a switch 216, diodes 218 and 220, a resistor 222, and a capacitor 224.

In one embodiment, the electromagnetic relay 200 controls a connection between the first port 202 and the second port 204. The state of the relay 200 is governed by the position of the movable armature 208. The movable armature 208 is held in an open state by spring 206. The electromagnetic relay 200 employs a magnetic field (e.g., magnetic field 214) to move the movable armature 208 from the open state to a closed state that connects the first port 202 with the second port 204.

The relay drive circuit 210 controls the position of the movable armature 208 responsive to, for example, a received control signal from controller 118. The received control signal may control a state of the switch 216. Closing the switch 216 induces a current in coil 212 that creates a magnetic field 214. The magnetic field 214 attracts the movable armature 208 to create a connection between the first port 202 and the second port 204. Opening the switch 216 disconnects the coil 212 from an external power source thereby causing the magnetic field 214 to decay. As the magnetic field 214 decays, the spring 206 pulls the movable armature 208 back to an open state that disconnects the first port 202 from the second port 204. An example switch 216 includes, but is not limited to, an insulated-gate bipolar transistor (IGBT), a metal-oxide semiconductor field-effect transistor (MOSFET), or a silicon-controlled rectifier (SCR).

The first power source terminal 228 is constructed to receive power at a first voltage level (e.g., 12 Volts), the coil 212 is rated to withstand the first voltage level, and the second power source terminal 230 is constructed to receive power at a second voltage level (e.g., 395 Volts) that is higher than the first voltage level. The second voltage level may be substantially the same as the voltage level of a DC bus of the UPS (e.g., DC bus 120 of UPS 100). In this embodiment, the voltage across the coil 212 immediately after the switch 216 closes is similar to the second voltage level and substantially beyond a rated voltage of the coil 212. As the coil 212 generates magnetic field 214, the voltage across the coil 212 drops to a voltage level at or below the first voltage level. The voltage level across the coil 212 may drop as the current through the inductor increases because the resistor 222 minimizes the amount of current available to the coil 212 from the second power source terminal 230. The resistance of resistor 222 may be, for example, 100,000 Ohms. The high voltage initially applied to the coil 212 temporarily creates a strong magnetic field to initially move the movable armature 208 from an open state to the closed state at an expedited rate. After the voltage across the coil drops, a weaker magnetic field is generated that holds the movable armature 208 in the closed position.

The electromagnetic relay 200 may further include a mechanical overdrive to expedite the rate at which the electromagnetic relay opens. The mechanical overdrive may include a spring with a high force constant that reduces the time required for the moveable armature from the closed state to the open state. The force constant of the spring may be sufficiently high that the magnetic field 214 induced by the coil 212 when only the lower first voltage level is applied is insufficient to move the moveable armature from the open state to the closed state. The magnetic field 214 induced by the coil 212 when the lower first voltage level is applied, however, may be sufficient to hold the movable armature in the closed position.

In one embodiment, the coil 212 has a voltage rating of 24 Volts and the strength of the magnetic field generated by applying 24 Volts to the coil 212 is sufficient to move the moveable armature from an open state to a closed state. In this embodiment, the spring requires 4.5 milliseconds to move the movable armature from the closed position to the open position after the coil 212 is disconnected from a power source. In one example, a mechanical overdrive is added that necessitates a voltage of at least 31 Volts be applied to the coil 212 in order to create a sufficiently strong magnetic field to initially move the movable armature from the open state to the closed state. This example mechanical overdrive reduces the time required to move the moveable armature from the closed state to the open state from 4.5 milliseconds to 3.3 milliseconds. In another example, a mechanical overdrive is added that necessitates a voltage of at least 46 Volts be applied to the coil 212 in order to create a sufficiently strong magnetic field to initially move the movable armature from the open state to the closed state. This example mechanical overdrive reduces the time required to move the moveable armature from the closed state to the open state from 4.5 milliseconds to 2.36 milliseconds.

The construction of the electromagnetic relay 200 is not limited to the normally-open construction illustrated in FIG. 2 where the spring 206 is fitted to keep the relay in an open state when switch 216 is open. The electromagnetic relay 200 may be constructed as a normally-closed relay where the spring 206 is fitted to keep the relay in a closed state when switch 216 is open. The state of the switch 216 may be controlled via a UPS controller (e.g., controller 118). An example UPS controller is described below with reference to FIG. 3.

Example UPS Controller

Figure 3:
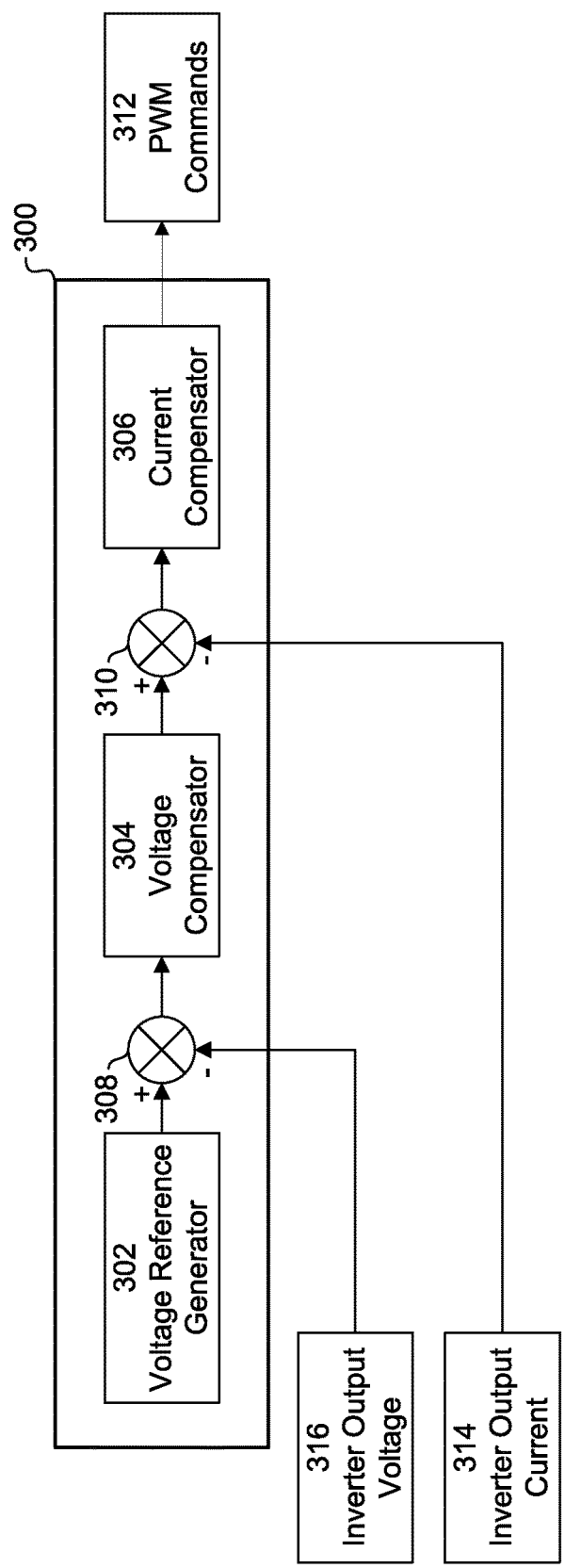
FIG. 3 illustrates a block diagram, of a UPS controller in accordance with one embodiment.

In at least one embodiment, the controller 118 is configured to expedite the transition between power delivery modes of the UPS 100. FIG. 3 illustrates an example controller 300 for a UPS (e.g., controller 118 for UPS 100) configured to quickly transition from a first power delivery mode to a second power delivery mode. The controller 300 outputs Pulse Width Modulation (PWM) commands 312 to an inverter (e.g., DC/AC inverter 108) based on a received inverter output voltage level 316 and a received inverter output current level 314. The controller 300 determines the PWM commands through a voltage reference generator module 302, a voltage compensator module 304, a current compensator module 306, and difference modules 308 and 310.

In one embodiment, the received inverter output voltage 316 is subtracted from a voltage reference signal generated by the voltage generator module 302 in difference module 308 to produce an error voltage. The error voltage is provided to a voltage compensator 304 that is constructed to generate a current signal based on the received error voltage. The received inverter output current 314 is subtracted from the current signal output by the voltage compensator module 304 in difference module 310 to produce an error current. The error current signal is provided to current compensator module 306 that is constructed to generate PWM commands 312 for the inverter (e.g., DC/AC inverter 108). The PWM commands 312 may direct one or more switching devices in the inverter to generate the desired output inverter waveform.

Figure 4:
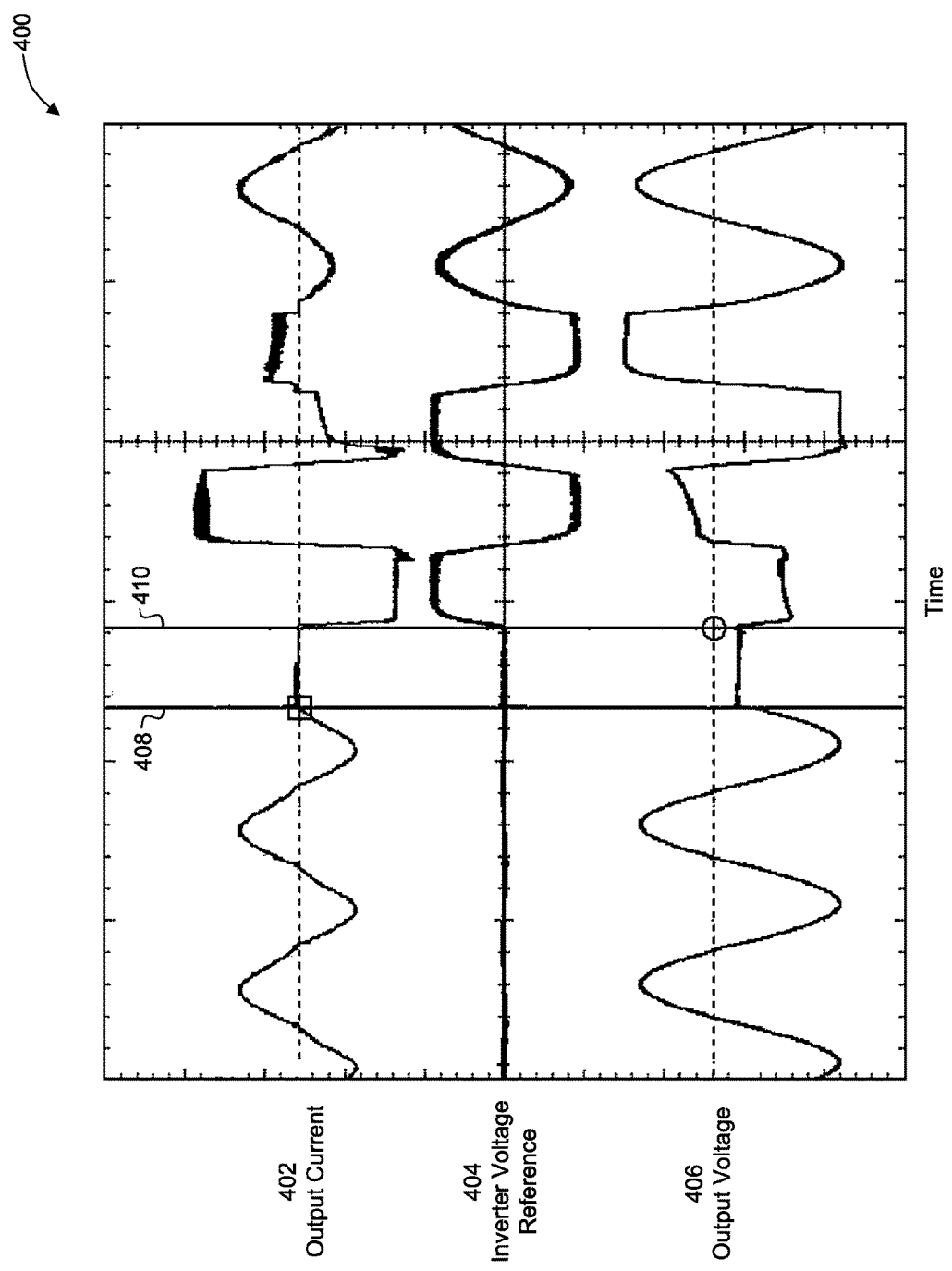
FIG. 4 is a graph illustrating various UPS waveforms.

In some embodiments, the voltage reference generator module 302 generates a modified voltage reference signal to increase the amount of power immediately available to an external load after connecting the inverter to the external load. For example, the voltage reference generator 302 may generate a non-sinusoidal voltage reference signal for a first period of time immediately after a power delivery mode change and generate a sinusoidal voltage reference signal after the first period of time. FIG. 4 is a graph illustrating various UPS waveforms 400 produced by employing a modified voltage reference signal. The UPS waveforms 400 include an output current waveform 402, an inverter voltage reference waveform 404, and an output voltage waveform 406 plotted against time during a power failure event 408 and an inverter turn-on event 410.

The output current waveform 402 illustrates the current supplied to a load coupled to the UPS. The output current waveform 402 and the output voltage waveform 406 prior to the power failure event 402 may be provided from an external AC power source (e.g., a power grid) coupled directly to the output via a bypass switch (e.g., bypass switch 110 in FIG. 1). The output current waveform 402 and the output voltage waveform 406 drop to zero directly after the power failure event 408. The UPS may open the bypass switch to disconnect the failed power source from the load and/or close a switch between an inverter (e.g., inverter switch 122) and the load in the time interval between the power failure event 408 and the inverter on event 410.

The inverter voltage reference waveform 404 is generated by the UPS (e.g., controller 118 of UPS 100) after the inverter turn-on event 410. The inverter voltage reference waveform 404 is a square wave for the first 2.5 power cycles before changing into a sinusoidal reference signal. For example, the line frequency may be 50 Hz and the inverter voltage reference waveform 404 may be a square wave for 50 milliseconds (i.e., 20 milliseconds per cycle*2.5 power cycles). In another example, the line frequency may be 60 Hz and the inverter voltage reference waveform 404 may be a square wave for approximately 41.5 milliseconds (i.e., approximately 16.6 milliseconds per cycle*2.5 power cycles). Employing a square wave for the first 2.5 cycles after the inverter turn on event 410 immediately provides power to the load as illustrated by the output current waveform 402 and the output voltage waveform 406. Other non-sinusoidal waveforms may be employed including, for example, a sinusoidal signal combined with pulse signals at the zero crossings, a flat-top sinusoidal signal, a pulse train, or any other signal that minimizes the zero crossing. In addition, the period of time that the inverter voltage reference is a non-sinusoidal signal is not limited to 2.5 cycles. For example, the duration of the non-sinusoidal reference signal may be between 1 and 1.5 cycles.

In some embodiments, the components described above with regard to FIG. 3 are software components that are executable by the controller 300. In other embodiments, some or all of the components may be implemented in hardware or a combination of hardware and software. Controller 300 may take a variety of forms dependent upon the specific application and processes used to perform the harmonic suppression. Example quick changeover processes are described below with reference to FIGS. 5-6 that may be executed by controller 300 or any computer system communicatively connected to the UPS such as the computer system described below with reference to FIG. 7.

Example Power Delivery Mode Change Processes

Figure 5:
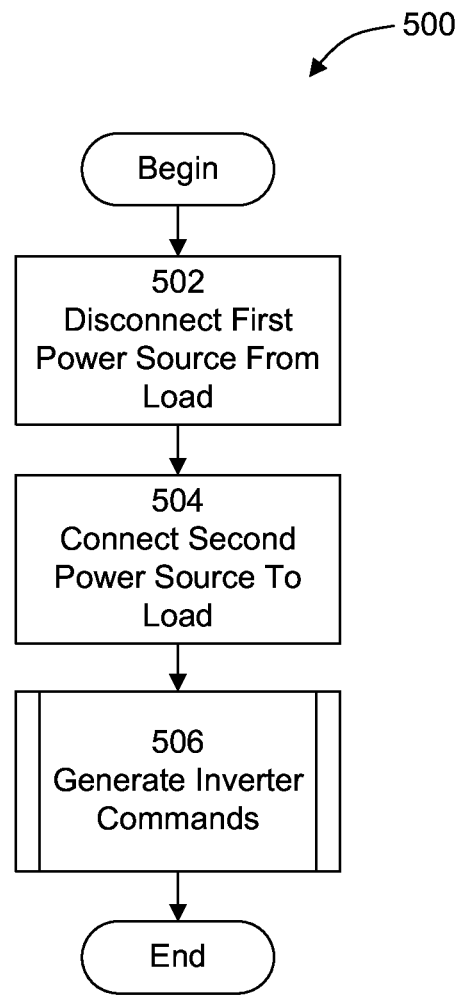
FIG. 5 is a flow diagram of one example quick power delivery mode change method.
Figure 6:
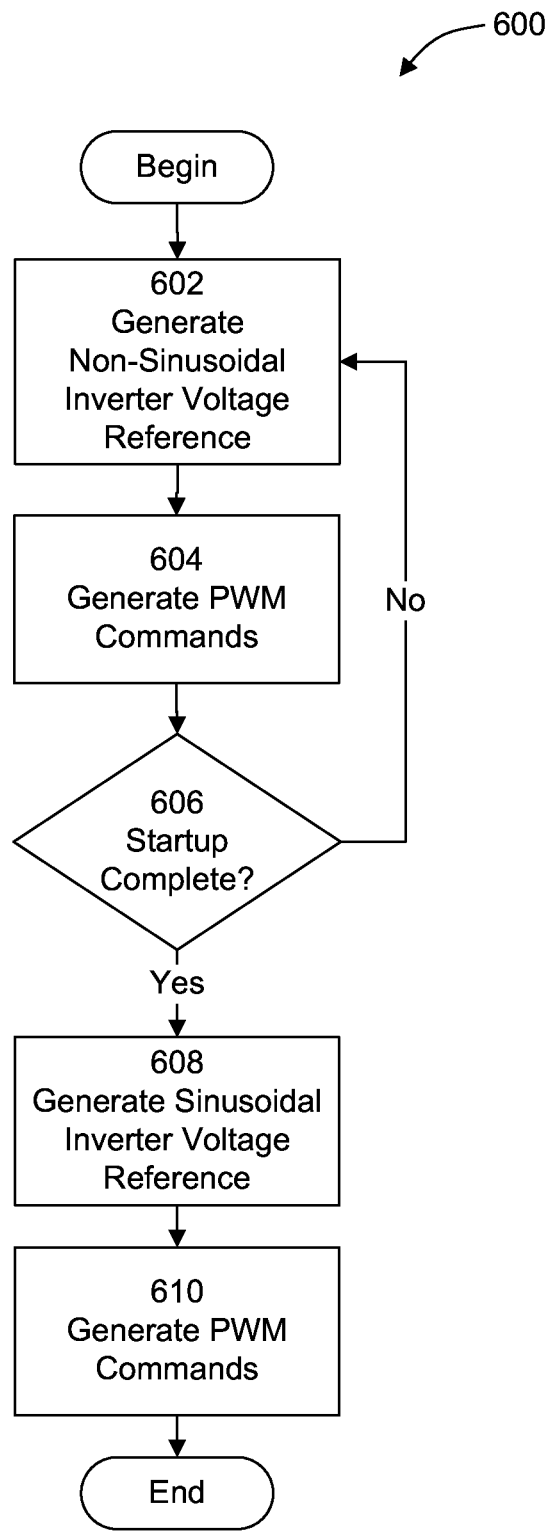
FIG. 6 is a flow diagram of one example method of generating inverter commands.

As described above with reference to FIGS. 1 and 3, several embodiments include controllers that perform processes which reduce the time required for a UPS to change from a first power delivery mode to a second power delivery mode. In some embodiments, these quick power delivery mode change processes are executed by a microprocessor-based computer system, such as the controller 118 in the UPS 100 described above with reference to FIG. 1 or the computer system 700 described below with reference to FIG. 7. FIG. 5 illustrates one example power delivery mode change process 500 performed by a UPS 100 (e.g., executed by controller 118 of UPS 100). The power delivery mode change process 500 may be performed after the UPS 100 experiences a power failure of a first power source. The power delivery mode change process 500 begins in act 502.

In act 502, the UPS 100 disconnects the first power source from the load. Disconnecting the first power source from the load may include transmitting a control signal to a switch (e.g., bypass switch 110) coupled between the first power source and the output. In act 504, the UPS 100 connects a second power source to the load. Connecting the second power source to the load may include transmitting a control signal to a switch (e.g., inverter switch 122) between the second power source (e.g., battery 114) and the output.

In act 506, the UPS 100 generates inverter commands. The inverter commands may include one or more switching commands to the inverter to cause the inverter to output AC power. The act 506 is described further below with reference to the example inverter command generation process 600 illustrated in FIG. 6. The inverter command generation process 600 begins in act 602.

In act 602, the UPS 100 generates a non-sinusoidal inverter voltage reference as described above with reference to FIG. 4. The non-sinusoidal inverter voltage reference signal includes, for example, one of or a combination of a square wave, a pulse train, and a flat-top sinusoidal signal. In act 604, the UPS 100 generates PWM commands based on the non-sinusoidal inverter voltage reference signal. The PWM commands may be transmitted to one or more switches in the inverter (e.g., DC/AC inverter 108) to cause the inverter to output AC power to the external load.

In act 606, the UPS 100 determines whether the startup phase is complete. The UPS 100 may determine whether the startup phase is complete based on a number of power cycles and/or a predetermined period of time including, for example, a period of time between 1 and 1.5 power cycles. If the UPS 100 determines that the startup phase is complete, the UPS 100 proceeds to act 608 where the UPS 100 generates a sinusoidal voltage reference and act 610 where the UPS 100 generates PWM commands based on the sinusoidal voltage reference. Otherwise, the UPS 100 returns to act 602 and continues to generate the non-sinusoidal inverter voltage reference signal.

Embodiments of the quick power delivery mode change techniques have been described for use in an online UPS 100 as shown in FIG. 1. In other embodiments, the quick power delivery mode change techniques may be provided in other types of UPSs including, for example, off-line, line-interactive, or any other type of UPS. The quick power delivery mode techniques may also be used in other types of power devices including, for example, any power device that switches between two or more power delivery modes.

In one example, the UPS may employ a bypass relay with a mechanical overdrive that controls the connection between a first power source and an external load to expedite the transition between two or more power delivery modes. In this example, the bypass relay with a mechanical overdrive employs an overrated spring that reduces the time required for the relay to change state and thereby reduce the time required to transition from providing output power from the first power source to providing output power from another power source. Alternatively or in conjunction with the bypass relay with the mechanical overdrive, the UPS may employ a non-sinusoidal wave for a first period of time as an inverter voltage reference to maximize the amount of current supplied to the external load by the inverter immediately after the external load is coupled to the inverter.

Furthermore, various aspects and functions described herein in accord with the present disclosure may be implemented as hardware, software, firmware or any combination thereof. Aspects in accord with the present disclosure may be implemented within methods, acts, systems, system elements and components using a variety of hardware, software or firmware configurations. Furthermore, aspects in accord with the present disclosure may be implemented as specially-programmed hardware and/or software.

Example Computer System

Figure 7:
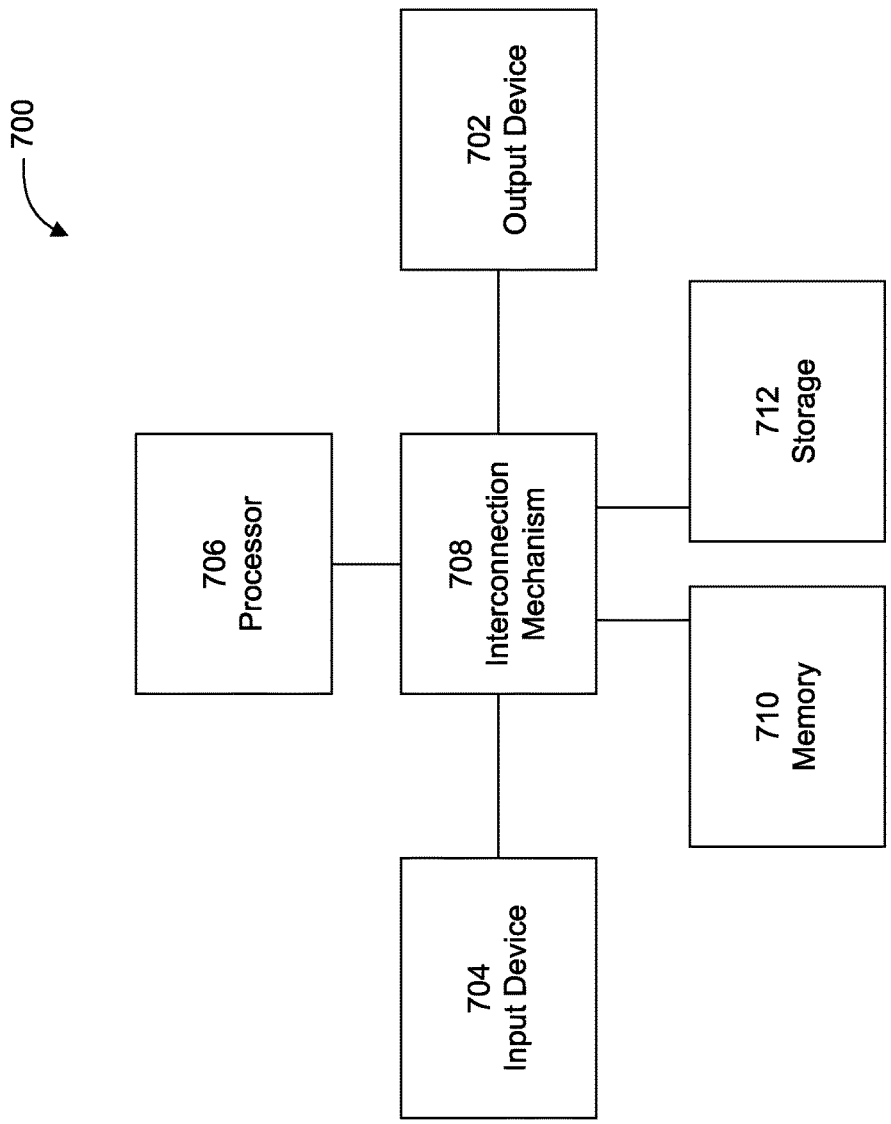
FIG. 7 is a block diagram of one example of a computer system upon which various aspects of the present embodiments may be implemented.

FIG. 7 illustrates an example block diagram of computing components forming a system 700 which may be configured to implement one or more aspects disclosed herein. For example, the system 700 may be communicatively coupled to a UPS or included within a UPS and configured to perform quick power delivery mode change processes as described above with reference to FIGS. 5-6.

The system 700 may include for example a general-purpose computing platform such as those based on Intel PENTIUM-type processor, Motorola PowerPC, Sun Ultra-SPARC, Texas Instruments-DSP, Hewlett-Packard PA-RISC processors, or any other type of processor. System 700 may include specially-programmed, special-purpose hardware, for example, an application-specific integrated circuit (ASIC). Various aspects of the present disclosure may be implemented as specialized software executing on the system 700 such as that shown in FIG. 7.

The system 700 may include a processor/ASIC 706 connected to one or more memory devices 710, such as a disk drive, memory, flash memory or other device for storing data. Memory 710 may be used for storing programs and data during operation of the system 700. Components of the computer system 700 may be coupled by an interconnection mechanism 708, which may include one or more buses (e.g., between components that are integrated within a same machine) and/or a network (e.g., between components that reside on separate machines). The interconnection mechanism 708 enables communications (e.g., data, instructions) to be exchanged between components of the system 700. Further, in some embodiments the interconnection mechanism 708 may be disconnected during servicing of a PDU.

The system 700 also includes one or more input devices 704, which may include for example, a keyboard or a touch screen. An input device may be used for example to configure the measurement system or to provide input parameters. The system 700 includes one or more output devices 702, which may include for example a display. In addition, the computer system 700 may contain one or more interfaces (not shown) that may connect the computer system 700 to a communication network, in addition or as an alternative to the interconnection mechanism 708.

The system 700 may include a storage system 712, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor may cause data to be read from the nonvolatile medium into another memory 710 that allows for faster access to the information by the processor/ASIC than does the medium. This memory 710 may be a volatile, random access memory such as a dynamic random access memory (DRAM) or static memory (SRAM). It may be located in storage system 712 or in memory system 710. The processor 706 may manipulate the data within the integrated circuit memory 710 and then copy the data to the storage 712 after processing is completed. A variety of mechanisms are known for managing data movement between storage 712 and the integrated circuit memory element 710, and the disclosure is not limited thereto. The disclosure is not limited to a particular memory system 710 or a storage system 712.

The system 700 may include a general-purpose computer platform that is programmable using a high-level computer programming language. The system 700 may be also implemented using specially programmed, special purpose hardware, e.g. an ASIC. The system 700 may include a processor 706, which may be a commercially available processor such as the well-known Pentium class processor available from the Intel Corporation. Many other processors are available. The processor 706 may execute an operating system which may be, for example, a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. An uninterruptable power supply (UPS) comprising:
an input constructed to receive input power;
an output to provide output alternating current (AC) power;
a bypass switch having an on state and an off state coupled between the input and the output;
an inverter coupled to the output and constructed to generate the output AC power based on inverter commands; and
a controller coupled to the inverter, the input, and the bypass switch, and configured to:
detect a power failure of the input power;
disconnect the input from the output at least in part by changing the bypass switch from the on state to the off state responsive to detecting the power failure; and
generate the inverter commands and provide the inverter commands to the inverter to output, by the inverter, the AC power based on an inverter reference signal responsive to detecting the power failure, the inverter reference signal having a non-sinusoidal voltage waveform for a first period of time and a sinusoidal voltage waveform after the first period of time.

2. The UPS of claim 1, wherein the non-sinusoidal voltage waveform is one of a square wave, a pulse train, and a flat-top sinusoidal signal.

3. The UPS of claim 1, wherein the first period of time is between 1 and 1.5 power cycles of the output AC power.

4. The UPS of claim 1, further comprising an inverter switch having an on state and an off state coupled between the inverter and the output.

5. The UPS of claim 4, wherein the controller is coupled to the inverter switch and the controller is further configured to connect the inverter to the output, at least in part by changing the state of the inverter switch from the off state to the on state.

6. The UPS of claim 1, wherein the bypass switch comprises:
a first terminal coupled to the first input;
a second terminal coupled to the output;
a first power source terminal constructed to receive power at a first voltage level;
a second power source terminal constructed to receive power at a second voltage level, the second voltage level being lower than the first voltage level;
a movable armature coupled between the first terminal and the second terminal, the movable armature having a first state that connects the first terminal to the second terminal and a second state that disconnects the first terminal from the second terminal;
a circuit coupled to the first power source terminal and to the second power source terminal, the circuit constructed to induce a first magnetic field of a first strength in a coil to move the moveable armature from the first state to the second state by applying the first voltage level to the coil and to induce a second magnetic field of a second strength in the coil to maintain the movable armature in the second position by applying the second voltage level to the coil, the second strength being weaker than the first strength; and a spring coupled to the moveable armature, the spring constructed to hold the moveable armature in the first state against an opposing magnetic field of the second strength.

7. The UPS of claim 6, further comprising a direct current (DC) bus coupled to the inverter and wherein the DC bus has a voltage level substantially equal to the first voltage at the first power terminal of the bypass switch.

8. The UPS of claim 6, wherein the coil has a voltage rating substantially equal to the second voltage level at the second terminal of the bypass switch.

9. The UPS of claim 6, wherein the circuit includes a first diode coupled between the first power source terminal and the coil and a second diode coupled between the second power source terminal and the coil.

10. The UPS of claim 9, wherein the circuit further includes a resistor coupled between the first diode and the first power source terminal.

11. A method for operating an uninterruptable power supply (UPS), the method comprising:

receiving input power from a first power source;

providing output power to an external load based on the input power from the first power source;

detecting a power failure of the first power source;

disconnecting the first power source from the external load responsive to detecting the power failure of the first power source;

receiving input power from a second power source;

generating an inverter voltage reference signal having a non-sinusoidal voltage waveform for a first period of time and having a sinusoidal voltage waveform after the first period of time;

generating inverter commands based on the inverter voltage reference signal; and generating output alternating current (AC) power derived from the second power source based on the inverter commands.

12. The method of claim 11, wherein generating the inverter voltage reference signal having the non-sinusoidal voltage waveform includes generating one of a square wave, a pulse train, and a flat-top sinusoidal signal.

13. The method of claim 11, wherein the first period of time is between 1 and 1.5 power cycles of the output AC power.

14. The method of claim 11, wherein disconnecting the first power source from the external load includes changing a bypass switch coupled between the first power source and the external load from an on state to an off state.

15. The method of claim 14, changing the bypass switch from the on state to the off state includes moving a moveable armature of an electromagnetic relay from a closed state to an open state by a spring coupled to the movable armature.

16. The method of claim 15, wherein the bypass switch further includes a coil having a voltage rating and wherein the spring is constructed to hold the moveable armature in the open state against an opposing magnetic field generated by applying a voltage level equal to the voltage rating to the coil.

17. The method of claim 11, wherein generating inverter commands includes generating pulse width modulation commands.

* * * * *